United States Patent
Yamamoto et al.

(10) Patent No.: US 8,377,551 B2
(45) Date of Patent: Feb. 19, 2013

(54) STRUCTURE FOR RECORDING MEDIUM

(75) Inventors: Ryosuke Yamamoto, Kawasaki (JP); Hiroki Tanaka, Fuchu (JP); Naoko Kihara, Matsudo (JP); Toshiro Hiraoka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/425,676

(22) Filed: Mar. 21, 2012

(65) Prior Publication Data

US 2012/0231213 A1  Sep. 13, 2012

Related U.S. Application Data

(63) Continuation of application No. PCT/JP2009/066972, filed on Sep. 29, 2009.

(51) Int. Cl.
*B32B 7/06* (2006.01)
*B32B 18/00* (2006.01)
*B32B 27/06* (2006.01)
*B32B 33/00* (2006.01)

(52) U.S. Cl. ........ 428/333; 428/426; 428/446; 428/457; 428/500; 428/702; 428/910

(58) Field of Classification Search .......................... None
See application file for complete search history.

(56) References Cited

U.S. PATENT DOCUMENTS

| | | |
|---|---|---|
| 2005/0087289 A1 | 4/2005 | Toyoda |
| 2009/0311633 A1 | 12/2009 | Ito |
| 2010/0210742 A1 | 8/2010 | Iyoda et al. |

FOREIGN PATENT DOCUMENTS

| | | | |
|---|---|---|---|
| EP | 1950799 A1 | * | 7/2008 |
| JP | 2002-241734 | | 8/2002 |
| JP | 2005-85799 | | 3/2005 |
| JP | 3926360 | | 6/2007 |
| JP | 2008-36491 | | 2/2008 |
| JP | 2008-55579 | | 3/2008 |
| JP | 2008-96596 | | 4/2008 |
| JP | 2009-57519 | | 3/2009 |
| JP | 2009-140866 | | 6/2009 |

OTHER PUBLICATIONS

International Search Report for PCT/JP2009/066972, mailed Oct. 27, 2009.

* cited by examiner

*Primary Examiner* — Ramsey Zacharia (74) *Attorney, Agent, or Firm* — Nixon & Vanderhye, P.C.

(57) ABSTRACT

A structure includes a substrate, a first layer formed on the substrate, and a second layer formed on the first layer. The first layer is comprised of self-assembled monolayer and contains 4-(6-hydroxyhexyloxy)-4'-methoxybiphenyl. The second layer is obtained by micro-phase separation of a block copolymer containing a hydrophilic polymer comprised of polyethylene oxide and a hydrophobic polymer comprised of polymethacrylic acid containing azobenzene at the side chain. The second layer contains a cylinder phase with its long axis being oriented perpendicular to the substrate. The thickness T of the second layer is within a range of $A \leq T \leq 50$ nm, where A is a phase separation period length satisfying $5 \text{ nm} \leq A \leq 50$ nm.

11 Claims, 5 Drawing Sheets

STRUCTURE FOR RECORDING MEDIUM

CROSS-REFERENCE TO RELATED APPLICATIONS

This application is a Continuation Application of PCT Application No. PCT/JP2009/066972, filed Sep. 29, 2009, the entire contents of which are incorporated herein by reference.

FIELD

Embodiments described herein relate generally to a structure.

BACKGROUND

A fine pattern of 30 nm or less is required for microfabricated high-density recording media such as next-generation semiconductor devices or patterned media. It is difficult to form such a fine pattern by current lithography techniques. A method of forming a fine pattern at lower cost and high throughput is proposed (see, for example, Japanese Patent No. 3926360 and JP-A 2009-57519 (KOKAI)). In the method, a fine pattern is formed using a microphase-separated structure by self-assembly of a block copolymer containing a mesogenic group.

As the thickness of such a block copolymer film is smaller, defect numbers and size variations after pattern transfer to the substrate are reduced. Consequently, a thin film with a thickness of 50 nm or less is considered to be desirable. However, when the thickness is set to 50 nm or less, the arrangement becomes random and the microphase-separated structure cannot be obtained.

DETAILED DESCRIPTION

In general, according to one embodiment, a structure comprises a substrate, a first layer formed on the substrate, and a second layer formed on the first layer. The first layer is comprised of a self-assembled monolayer comprising a compound represented by Formula (3) below. The second layer is obtained by micro-phase separation of a block copolymer containing a hydrophilic polymer comprised of polyethylene oxide and a hydrophobic polymer comprised of polymethacrylic acid containing azobenzene at the side chain. The second layer contains a cylinder phase with its long axis being oriented perpendicular to the substrate. The thickness T of the second layer is within a range of $A \leqq T \leqq 50$ nm, where A is a phase separation period length satisfying $5 \text{ nm} \leqq A \leqq 50 \text{ nm}$.

(3)

Q2 is selected from the group consisting of a methylene group, a phenylene group, a naphthalene group, a divalent organic group comprising at least one methylene group, a divalent organic group comprising at least one phenylene group, and a divalent organic group comprising at least one naphthalene group. Ms2 is a mesogenic group represented by Formula (4A) or (4B) below.

(4A)

(4B)

$R^{40}$ to $R^{49}$ may be the same or different and represent a hydrogen atom, an alkyl group having 1 to 4 carbon atoms or an alkoxy group having 1 to 4 carbon atoms.

Hereinafter, the embodiments will be described.

Figure 1:
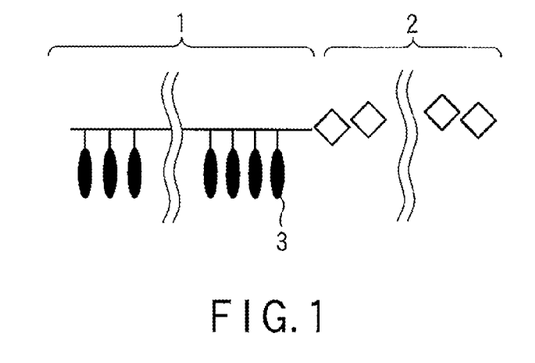
FIG. 1 is a pattern diagram showing an example of block copolymer configuration.
Figure 2:
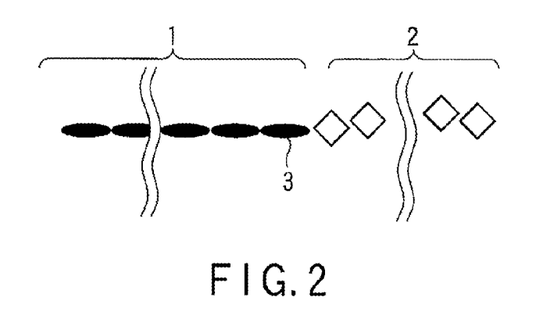
FIG. 2 is a pattern diagram showing another example of block copolymer configuration.

A hydrophobic polymer and a hydrophilic polymer are included in a block copolymer which forms a microphase-separated structure by self-assembly. The block copolymer used in this embodiment contains, for example, as shown in FIG. 1, a hydrophobic polymer 1 having mesogenic groups 3 at the side chains and a hydrophilic polymer 2. As shown in FIG. 2, the mesogenic groups 3 may be included in the main chain of the hydrophobic polymer 1.

In this embodiment, the hydrophobic polymer 1 is polymethacrylic acid (PMA) containing azobenzene (Az) as the mesogenic group 3 and the hydrophilic polymer 2 is polyethylene oxide (PEO). A block copolymer $(\text{PEO})_x\text{-b-}(\text{PMA}(\text{Az}))_y$ (b means the copolymer is a block copolymer and x and y represent integers) which contains the hydrophobic polymer and the hydrophilic polymer is used in this embodiment.

When a polymer film containing the block copolymer is formed on a substrate and annealing treatment is performed, a disorderly oriented state of the block copolymer is changed.

The copolymer is microphase-separated into a structure in which the hydrophobic $(PMA(Az))_y$ becomes a matrix, and the hydrophilic $(PEO)_x$ becomes a cylinder phase which is arranged perpendicular to the substrate. A fine structure with a phase separation of period length of 10 to 15 nm is formed.

Figure 3:
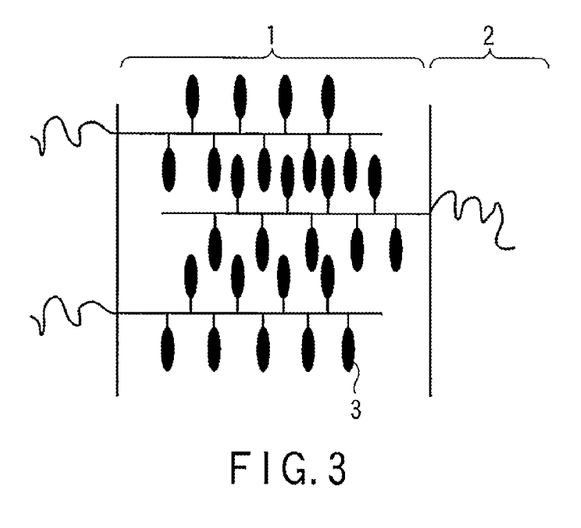
FIG. 3 is a pattern diagram showing a state of micro-phase separation.

In the cylinder phase after the phase separation, the orientation of the mesogenic group does not exhibit dependence on an interfacial energy between the substrate and the block copolymer. The cylinder phase becomes perpendicular to the substrate. Taking the hydrophobic polymer 1 having the mesogenic groups 3 at the side chains as an example, it will be described as follows. As shown in FIG. 3, in the block copolymer, the mesogenic groups 3 at the side chains of the hydrophobic polymer 1 of the block copolymers are alternately oriented and the long axis directions of the mesogenic groups are coordinated with each other. As a result, an energetically stable state is attained, and the hydrophobic portions and the hydrophilic portions are clustered, respectively.

Not only thermodynamic stabilization but also energy stabilization at a molecular level contributes. The energetic stabilization at a molecular level is based on an interaction derived from the mesogenic groups with large dispersion force. In the case of a block copolymer having the mesogenic groups in the main chain, the long axis directions of the mesogenic groups 3 are coordinated with each other, resulting in energetic stability.

In addition to the above hydrophobic polymer and hydrophilic polymer, a block may be further included. For example, a block copolymer having another block between the hydrophobic polymer and the hydrophilic polymer or at out of the copolymer is cited. Any block which does not impair the microphase-separated structure can be used. It can be selected from, for example, polyethylene, polybutadiene, polyisoprene, polystyrene, polyvinyl pyridine, and polymethylmethacrylate.

The molecular weight of the block copolymer is not particularly limited. Preferably, the weight average molecular weight is in a range of 10000 to 200000. When the block copolymer having such molecular weight is used, the copolymer can have the form of microphase-separated structure without being accompanied by any trouble. The weight average molecular weight of the block copolymer is more preferably from 12000 to 50000.

It is desired that the hydrophobic polymer accounts for 50 to 98% of the weight of the whole block copolymer. When the hydrophobic polymer is included in such amount, the hydrophobic polymer constitutes neither a cylinder domain nor a sphere domain. The content of the hydrophobic polymer is more preferably from 70 to 96% by weight.

The block copolymer as described above is dissolved in a suitable solvent and used as a solution. Usable examples of the solvent include a ketone-based solvent, a cellosolve-based solvent, an ester-based solvent, an ether-based solvent, and an aromatic-based solvent.

Examples of the ketone-based solvent include cyclopentanone, cyclohexanone, acetone, ethyl methyl ketone, and methyl isobutyl ketone. Examples of the cellosolve-based solvent include methyl cellosolve, methyl cellosolve acetate, ethylcellosolve acetate, and butyl cellosolve acetate. Examples of the ester-based solvent include ethyl acetate, butyl acetate, isoamyl acetate, γ-butyrolactone, 3-methoxy methyl propionate, and diethyl carbonate. Examples of the ether-based solvent include diethylene glycol dimethyl ether and ethylene glycol monomethyl ether. Examples of the aromatic-based solvent include toluene, xylene, anisole, tetralin, and tetramethyl benzene.

Further, lactates such as ethyl lactate and propylene glycol monoethyl acetate (PGMEA) can also be used.

The concentration of the block copolymer in the solution can be suitably selected depending on coating conditions. Generally, it is from 1 to 10% by weight. As for the method of applying the solution, any method can be used and selected. Examples thereof include roller coating, dip coating, brush coating, spray coating, and curtain coating methods.

The substrate to which the solution is applied is subjected to surface treatment such as chemical modification. Alternatively, a groove may be formed in the substrate in advance. This will be described later.

The formed polymer film is subjected to annealing treatment to facilitate the formation or arrangement of the cluster. The annealing treatment can be performed by heating the substrate at a temperature that is more than a glass transition temperature of the block copolymer and is less than a melting point of the block copolymer. The treatment temperature is usually from about 120 to 300° C., preferably from about 130 to 240° C.

In a state where the micro-phase separation is occurred after the annealing treatment, the block copolymer forms the cluster in which a plurality of its molecules are clustered. The size of the cluster varies depending on the type of block forming the block copolymer, the type of solvent being used, and the temperature. Generally, a diameter $A_0$ of the cluster is from 1 to 100 nm in sphere equivalent diameter. When the diameter $A_0$ is from 2 to 30 nm, microfabrication can be realized at a pitch of 30 nm or less, which is preferred.

A polymer pattern comprised of a left domain can be formed by etching the polymer film in which the microphase separation is occurred to remove one domain. For example, when etching is performed using $O_2$ plasma, the cylinder phase which is the PEO domain is removed and the mesogenic group containing hydrophobic polymer domain with high etching resistance is left. The substrate is etched with gas such as fluorine-based $CF_4$ or $SF_6$ using the obtained polymer pattern as a template and a hole pattern is obtained.

When the substrate is treated (dyeing treatment) with metal oxides ($AgNO_2$, $RuO_4$, $OsO_4$, etc.) prior to etching, dot-shaped metal is contained in the PEO domain. This allows the etching resistance of the cylinder phase to be improved as compared with that of the matrix. The hydrophobic polymer domain is removed by etching using $O_2$ plasma. In this case, the hydrophilic polymer of the cylinder phase is also removed, however the metal dot by dyeing the cylinder phase remains.

The substrate can also be processed by dry etching using the metal dot as a template. For example, a microphase-separated layer of the block copolymer is first produced on a silicon substrate and then the PEO region is dyed with Ag particles. Thereafter, the PEO is etched by $O_2$ plasma etching to form a Ag dot on the substrate. A convex dot pattern can be transferred to the silicon substrate by etching the silicon substrate using a fluorine-based etching gas and using the Ag dot as a mask.

When the pattern is transferred to the substrate using the mask obtained by the microphase-separated structure of the block copolymer, inferior transfer (defect) and disorder of the self-assembled arrangement may be caused. One of the causes of these problems is disorder of the orientation of the cylinder phase used as an etching mask to the substrate. The thickness of the polymer film is also a cause of the disorder of the orientation. In patterned media, a pitch of 30 nm or less is needed. In this case, the thickness of the etching mask is preferably 100 nm or less, more preferably 50 nm or less.

In order to form the microphase-separated structure, the polymer film needs to have a thickness more than a phase separation period length A. However, in the case of a polymer film with a thickness of 50 nm or less formed on the silicon substrate, the cylinder arrangement of the microphase-separated structure becomes random. Thus, the orientation of the phase-separated structure becomes irregular. Orientation control of the block copolymer has been performed by using surface treatment for substrate or an orientation control layer. For example, a method in which an orientation film is formed on a substrate is cited. A polyimide film or a film of a random copolymer of the constituents of the block copolymer is used. However, a suitable random copolymer cannot be easily synthesized. Further, a block copolymer which contains azobenzene as a mesogenic group has poor wettability to the polyimide film. Accordingly, it has been difficult to control the orientation.

Additionally, the orientation film needs to be subjected to rubbing treatment to allow the orientation to be adjusted in advance. In the case of application to patterned media, a soiled surface causes a great problem, which is not preferred.

In order to control the orientation of the block copolymer containing a mesogenic group, it is desired to use a material with a high affinity for the block copolymer and employ a procedure which produces less contamination during the substrate treatment. In this embodiment, the orientation of the block copolymer is controlled by using a self-assembled monolayer (SAM) in which the orientation of mesogenic groups are spontaneously coordinated with each other. It is preferable that the mesogenic group in the SAM is different from the mesogenic group in the block copolymer. The stability of the orientation is improved by using a mesogenic group with a larger dipole moment.

In one embodiment, the SAM is formed on a predetermined region of the substrate using a mesogenic group containing silane coupling agent represented by Formula (1) below. Usable examples of the substrate include a glass substrate and a silicon substrate. A film of amorphous silicone, $SiO_2$, chromium, nickel, or tantalum may be formed on the above substrate.

(1)

In Formula (1) above, $R^{11}$, $R^{12}$, and $R^{13}$ may be the same or different, at least one of them represents a halogen atom or an alkoxy group having 1 to 6 carbon atoms and the others are selected from the group consisting of a halogen atom, a hydrogen atom, an alkyl group having 1 to 6 carbon atoms, and an alkoxy group having 1 to 6 carbon atoms. Introduction of a halogen atom or an alkoxy group having 1 to 6 carbon atoms as at least one of $R^{11}$, $R^{12}$, and $R^{13}$ results in ensuring of a space where the mesogenic group in the block copolymer is inserted between molecules which are contained in the SAM and bonded on the substrate. As a carbon chain is longer, the amount of silane coupling agent molecule to be bonded to the substrate is decreased and the orientation controllability of the block copolymer is reduced. Therefore, the upper limit of the carbon number of alkyl group and alkoxy group is defined as 6.

A chlorine atom or a bromine atom is preferred as the halogen atom. The carbon number of the alkoxy group is more preferably from 1 to 4 and the carbon number of the alkyl group is more preferably from 1 to 4.

Q1 is selected from the group consisting of a methylene group, a phenylene group, a naphthalene group, a divalent organic group containing at least one methylene group, a divalent organic group containing at least one phenylene group, and a divalent organic group containing at least one naphthalene group. As for the methylene, phenylene, and naphthalene groups, a part of hydrogen atoms may be substituted by an alkyl group. Examples of the alkyl group include a methyl group, an ethyl group, a propyl group, an isopropyl group, a butyl group, a pentyl group, and a hexyl group. Q1 may have an ether bond at its terminal.

Ms1 is a mesogenic group represented by Formula (2A) or (2B) below.

(2A)

(2B)

In the formulas above, $R^{21}$ to $R^{28}$ may be the same or different and represent a hydrogen atom or an alkyl group having 1 to 4 carbon atoms. The carbon number of alkyl group to be introduced as $R^{21}$ to $R^{28}$ is preferably from 1 to 4.

In the compound represented by Formula (1) above, a specified mesogenic group Ms1 and the Si atom are bonded together via a specified divalent organic group Q1. Since a distance between the mesogenic group and the substrate is maintained, influences such as disorder of the monomolecular film due to concavo-convex portions on the surface of the substrate and adhesion to the surface of the substrate can be minimized. Therefore, the compound represented by Formula (1) above is suitably used for formation of the SAM.

In another embodiment, a mesogenic group containing compound with an OH group at its terminal represented by Formula (3) below is used to form the SAM.

(3)

In Formula (3) above, Q2 is selected from the group consisting of a methylene group, a phenylene group, a naphthalene group, a divalent organic group containing at least one methylene group, a divalent organic group containing at least one phenylene group, and a divalent organic group containing at least one naphthalene group. As for the methylene, phenylene, and naphthalene groups, a part of hydrogen atoms may be substituted by an alkyl group. Examples of the alkyl group include a methyl group, an ethyl group, a propyl group, an isopropyl group, a butyl group, a pentyl group, and a hexyl group. Q2 may have an ether bond at its terminal.

Ms2 is a mesogenic group represented by Formula (4A) or (4B) below.

In the formulas above, $R^{40}$ to $R^{49}$ may be the same or different and represent a hydrogen atom, an alkyl group having 1 to 4 carbon atoms or an alkoxy group having 1 to 4 carbon atoms. The carbon number of alkyl group to be introduced as $R^{40}$ to $R^{49}$ is preferably from 1 to 4 and the carbon number of alkoxy group is preferably from 1 to 4.

In the compound represented by Formula (3), the specified mesogenic group Ms2 and the OH group are bonded together via the specified divalent organic group Q2. Since a distance between the mesogenic group and the substrate is maintained, influences such as disorder of the monomolecular film due to concavo-convex portions on the surface of the substrate and adhesion to the surface of the substrate can be minimized. Therefore, the compound represented by Formula (3) above is suitably used for formation of the SAM.

The compound as described above is dissolved in a solvent such as toluene, xylene, ethyl lactate, or PGMEA to prepare a solution for SAM formation. The concentration in the solution is preferably from about 0.5 to 5.0% by weight. The SAM is formed by applying the solution for SAM formation onto a predetermined substrate and performing annealing treatment. For example, in the case of the compound represented by Formula (3), when the annealing treatment is carried out at 100 to 200° C., the terminal OH group reacts with the OH group on the surface of the substrate and they are chemically bonded. The substrate is cleaned with a suitable organic solvent to remove unreacted molecules and a SAM having a mesogenic group on a surface thereof is obtained. The solvent to be used can be suitably selected depending on the solubility of a molecule that is used as a SAM raw material and the solvent purity. Examples thereof include isopropyl alcohol (IPA) and ordinary high-purity thinner solutions being used for semiconductor resist materials (e.g., PGMEA, ethyl lactate, and anisole).

In order to enhance the uniformity of the orientation of domains in the phase separation of block copolymer using the obtained SAM, it is desired that the mesogenic group of the block copolymer is inserted between mesogenic groups of the SAM. For example, in Formula (1) above, it is preferable that the interval between the mesogenic group Ms1 and the Si atom is larger. In Formula (3) above, it is preferable that the interval between the mesogenic group Ms2 and the OH group is larger.

It is preferred that Q1 in Formula (1) be large enough for the mesogenic group Ms1 so that the mesogenic groups Ms1 may not be sterically congested. Similarly, it is preferred that Q2 in Formula (3) be large enough for the mesogenic group Ms2 so that the mesogenic group Ms2 may not be sterically congested. When the SAM having such a structure is used, a phase-separated structure of the block copolymer is orderly arranged even with a thinner thickness.

Figure 4:
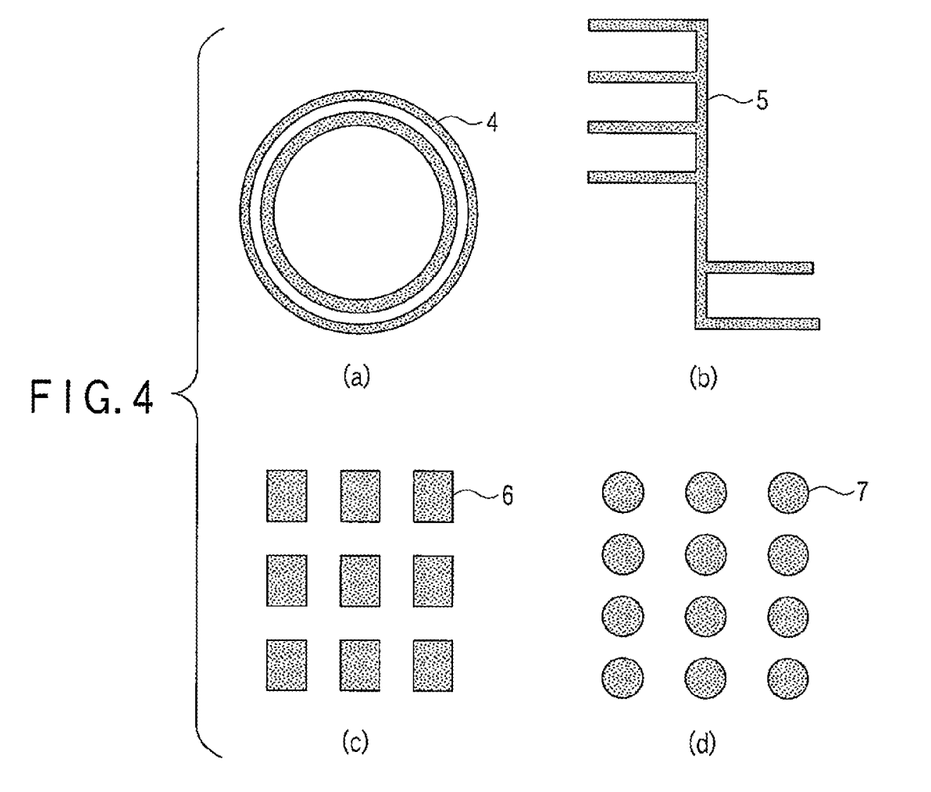
FIG. 4 is a pattern diagram showing an arrangement pattern of block copolymer.

In order to produce bit-patterned media or integrated circuits, it is necessary to coordinate the arrangement of block copolymer to be in a predetermined region on the substrate. Examples of the region include a concentric region 4 shown in FIG. 4(a), a region of lines 5 shown in FIG. 4(b), a rectangular region 6 shown in FIG. 4(c), and a circular region 7 shown in FIG. 4(d). The combination of these shapes may be used. The arrangement of the block copolymer is not limited thereto. In order to allow the block copolymer to be perpendicularly oriented on the predetermined region of the substrate with small thickness, the SAM is formed on the surface of the predetermined region of the substrate. Alternatively, a groove is formed in the specified region in advance and the SAM is formed on at least one of the bottom or sidewall of the groove.

In order to form the SAM on the predetermined region of a plain surface of the substrate, the SAM and a resist film are sequentially formed on the entire substrate. A target region of the resist film is exposed to light by a procedure such as photolithography, electron beam lithography, and X-ray lithography. The resist material may be suitably selected according to the exposure method. When a positive resist is used, the exposed portion of the resist film is selectively removed by pattern exposure and development and the SAM is exposed. The unexposed portion of the resist film is reserved so that a resist pattern is formed.

Ozone cleaning or $O_2$ plasma etching is performed using the obtained resist pattern as a mask to remove the SAM selectively and the surface of the substrate is exposed. A patterned SAM is formed on the predetermined region of the substrate by cleaning the resist pattern with a solvent to remove it. The patterned SAM is referred to as a chemical guide region. When a positive resist is used, the chemical guide region is formed corresponding to the unexposed portion and the region corresponding to the exposed portion of the surface of the substrate is exposed.

The cluster generated in the block copolymer is arranged in a region corresponding to the unexposed portion of the surface of the substrate. The shape of the region in which the cluster is arranged may be either circular or rectangular. However, a sufficient size in which the microphase separation is possible in the region is needed. When an arrangement period (phase separation period length) of the cluster generated in a block copolymer is A, at least one portion that is larger than A needs to be present in the region.

In the case of a negative resist, on the contrary, the exposed portion is designed in advance so as to be a region which allows the block copolymer to be arranged.

A nanoimprinting process of pushing a stamper having a groove pattern formed under high pressure to transfer the groove pattern to a polymer film may also be employed. For example, an organic-based material and a silicon-containing polymer can be used as the polymer film. Examples of the organic-based material include polystyrene, polymethylmethacrylate, polyimide, and novolak resin. Examples of the silicon-containing polymer include HSQ (hydrogen silsesquloxane) and SOG (spin-on glass). When a transparent stamper like a quartz mold is used, an optical nanoimprinting process using a photo-curing resin can also be used.

A groove pattern is transferred to a polymer film on a SAM using a stamper having a pattern in an arrangement region formed. For example, in the case of a polymer film comprised of an organic-based material, the film is etched by reactive ion etching (RIE) to allow the SAM to be exposed to the bottom of the groove pattern. The SAM at the bottom of the groove is removed by further proceeding etching to expose the surface of the substrate.

When the polymer film is removed by washing with a suitable solvent, a patterned SAM (chemical guide region) is obtained in a predetermined region of the substrate. In order to maintain etching resistance in a region for leaving the SAM, a method including forming a metal thin film on the polymer film and removing the polymer film in a process such as liftoff may be used.

The above processes enable the SAM to be selectively reserved in a specified region on the plane surface of the substrate. A polymer film containing block copolymer is coated, in a predetermined thickness, on the substrate having such SAM to produce a microphase-separated structure. When the thickness of the polymer film is more than 80 nm, a cylinder phase becomes a phase-separated structure perpendicular to the substrate in all regions.

Figure 5:
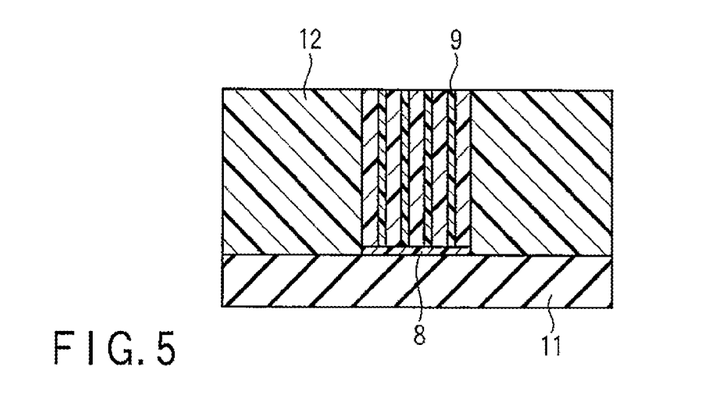
FIG. 5 is a pattern diagram showing an example of a microphase-separated polymer film.

When the thickness is less than 50 nm, as shown in FIG. 5, a cylinder phase 9 shows a phase-separated structure perpendicular to a substrate 11 only in a region where the SAM 8 is present. A remaining region 12 of the polymer film has a multi-grain structure in which the arrangement of the cylinder phase is disordered. Thus, a structure in which the arrangement of the microphase-separated structure is adjusted with high accuracy only in the chemical guide area is formed.

Figure 6:
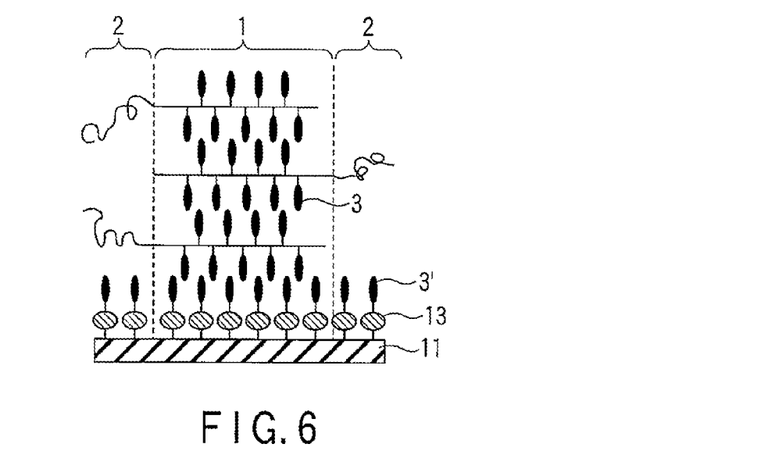
FIG. 6 is a pattern diagram showing an example of an ordered arrangement of block copolymer.

As shown in FIG. 6, mesogenic groups 3' in the SAM and mesogenic groups 3 in the block copolymer are alternately coordinated so that they are energetically stable. When bulky substituents 13 are present in a component of the SAM, the mesogenic groups 3' in the SAM and the mesogenic groups 3 in the block copolymer tend to alternately enter. Therefore, an energetic stabilization effect based on a dipole-dipole interaction between the mesogenic groups is further improved.

A phase separation region having a highly accurate boundary can be obtained by forming the SAM in the predetermined region and setting the thickness of the polymer film to the phase separation period length A or more and 50 nm or less. As a result, it is possible to form a super-thin film structure having a cylinder phase perpendicular to a substrate.

The block copolymer can also be arranged in a groove formed in a surface of a substrate such as a Si substrate or a glass substrate. There is a preferred range of the size of the groove and it can be specified using the phase separation period length A of the block copolymer. A groove width W is preferably $W \geq A$ and a groove depth D is desirably $D \geq A/2$. In this embodiment, the period length A is equal to a diameter $A_0$ of a cluster is the block copolymer or larger than it. Specifically, the period length A is 5 nm or more and 50 nm or less. According to this, the groove width W and the groove depth D are determined. Under such conditions, a phase-separated structure is selectively formed in the groove by coating a suitable amount of block copolymer to the substrate.

When forming a groove in the substrate, for example, a resist film is formed on the substrate and the resist film is patterned by a predetermined procedure. For example, photolithography, electron beam lithography, X-ray lithography, and the like can be used. The groove is formed by processing the substrate using the resist pattern.

In order to produce the SAM at the bottom of the groove, the SAM is produced on the whole substrate by the above method. A resist film for lithography is formed thereon, followed by performing pattern exposure and development to form a resist pattern. The SAM appears at the bottom between resist patterns. The groove may be formed by transferring a pattern by the above nanoimprinting process. As the polymer film, the organic-based material and the silicon-containing polymer can be used.

Figure 7:
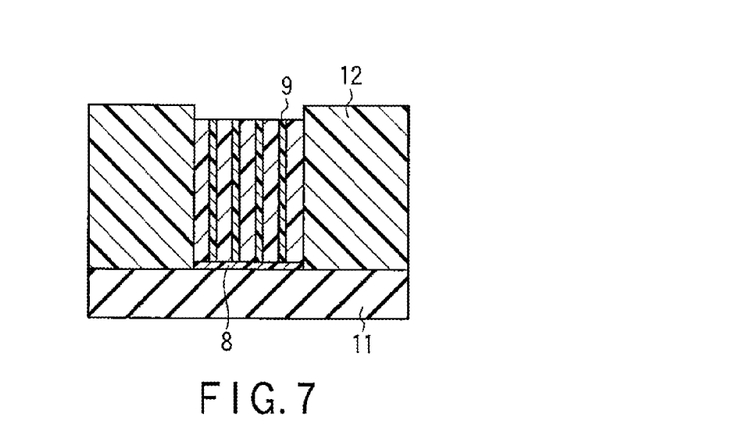
FIG. 7 is a pattern diagram showing another example of a microphase-separated polymer film.

The structure as shown in FIG. 7 can be produced by the above processes. As illustrated, the SAM 8 is formed at the bottom of the groove and a block copolymer film having the cylinder phase 9 is disposed thereon. When the groove depth is 50 nm or more and the thickness of the block copolymer film is also 50 nm or more, a structure with a cylinder phase perpendicular to a substrate is obtained even if the SAM is not necessarily formed at the bottom of the groove.

When the groove depth is 50 nm or more and the thickness of the block copolymer film is 50 nm or less or when the groove depth is 50 nm or less, the SAM needs to be formed at the bottom of the groove. As shown in FIG. 7, the presence of the SAM 8 at the bottom of the groove enables a microphase-separated structure whose orientation is controlled with high accuracy to be produced.

In order to allow the block copolymer to be arranged in the groove, the SAM may be formed at a sidewall of the groove. When subjecting the phase-separated structure thus obtained to base substrate processing as a template, a pattern can be directly transferred to the substrate without any influence on the chemical guide. The control of the orientation of the cylinder phase by the sidewall leads to this advantageous point.

Figure 8:
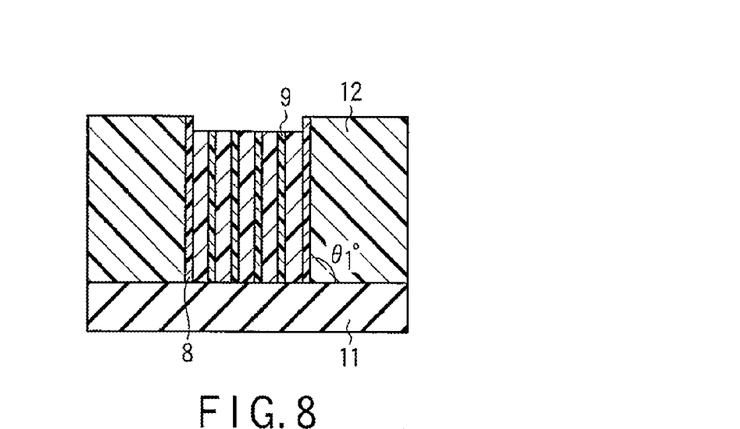
FIG. 8 is a pattern diagram showing another example of a microphase-separated polymer film.

The SAM 8 of the sidewall of the groove as shown in FIG. 8 can be produced by, for example, procedures below. A film comprised of a silica material or metal is first formed on a substrate and a groove is formed. A solution for SAM formation is coated on the sidewall of the groove, followed by annealing treatment. As the solution for SAM formation, a compound represented by Formula (1) above or a solution of a compound represented by Formula (3) is used.

As already described, a surface reaction is induced by the annealing treatment, resulting in formation of the SAM. Since the orientation of the mesogenic groups in the SAM becomes almost parallel to the sidewall, the orientation of the mesogenic groups in the block copolymer also becomes parallel to the sidewall. As a result, the cylinder phase which is phase-separated by the period length A becomes almost parallel to the sidewall. In order to allow the cylinder phase in a block copolymer film with a thickness T to be oriented to the substrate, an angle $\theta_1$ formed by the sidewall and the substrate needs to satisfy the following relationship:

$$\tan \theta_1 > 2T/A.$$

For example, in the case of the silica material, a groove can be produced by subjecting a silicon containing resist such as HSQ to electron beam drawing. The nanoimprinting process may be employed by using SOG as an imprint material. When a block copolymer solution is coated on the substrate having a groove whose sidewall has been subjected to surface treatment, as shown in FIG. 8, the SAM 8 is formed on the sidewall of the groove and a structure in which a microphase-separated block copolymer film having the cylinder phase 9 in the groove is disposed is obtained.

Figure 9:
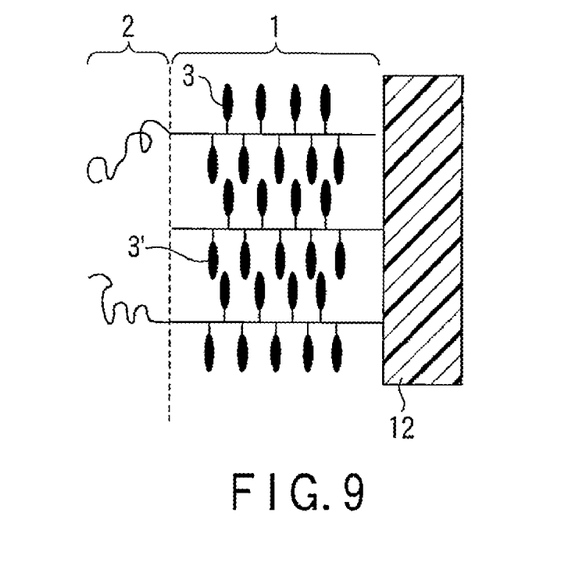
FIG. 9 is a pattern diagram showing another example of an ordered arrangement of block copolymer.

In such a block copolymer film, as shown in FIG. 9, the mesogenic groups 3' in the SAM and the mesogenic groups 3 in the block copolymer are alternately oriented so that a long axis of the cylinder phase in the block copolymer film becomes parallel to the sidewall. That is, a structure with the long axis of the cylinder phase being perpendicular to the surface of the substrate is stably obtained.

Figure 10:
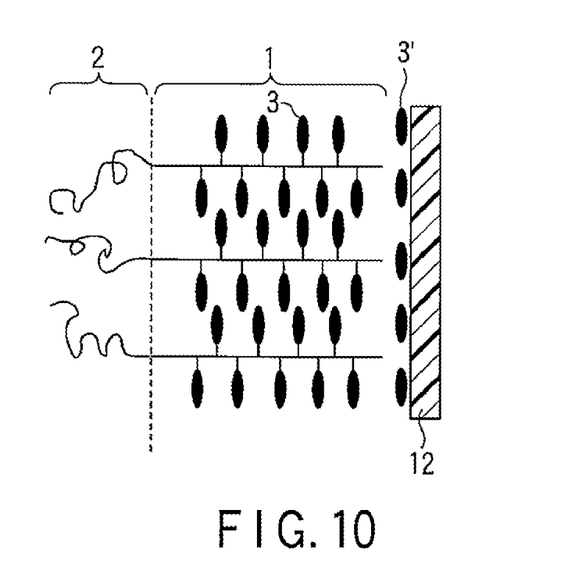
FIG. 10 is a pattern diagram showing another example of an ordered arrangement of block copolymer.

As a material for forming the groove, a mesogenic group-containing polymer can also be used. The mesogenic group-containing polymer is coated and the groove is transferred by the above nanoimprinting process. The sidewall of the groove and the stamper rub against each other when removing the stamper. As a result, the direction of mesogenic groups on the sidewall surface becomes parallel to the sidewall. A block copolymer film is formed on such a substrate and subjected to annealing treatment to produce a phase-separated structure with a cylinder phase being perpendicular to the substrate. In the structure to be obtained, as shown in FIG. 10, the mesogenic groups 3' in the block copolymer is oriented to the orientation of the mesogenic groups being uniformly arranged on the sidewall of the groove. This allows the structure with the cylinder phase being disposed parallel to the sidewall to be stable.

When patterning is performed on the substrate using a phase-separated block copolymer as an etching mask, inferior transfer (defect) occurs. During a processing process of transferring a pattern to a substrate, for example, a lack of a pattern, worsening of edge roughness, a variation in domain size, and a position shift of the center of gravity on a substrate are caused. The pattern defects and generation of variations during the substrate processing become big problems when producing electronic devices or storage media. For example, when applied to the patterned media, those problems cause worsening of jitter characteristics of a reproduced signal, a deficiency of a data portion, and the like. Since a signal strength at a high signal-to-noise ratio is not obtained, it may be impossible to write and read a record.

A lack of etching resistance of a material itself is cited as a factor of the defect and generation of variation during the patterning for substrate processing. The etched surface of a polymer material itself such as PEO or PMA constituting a main chain becomes significantly rough due to the dry etching processing. A second cause is a variation in the orientation of the cylinder phase. The cylinder phase is oriented perpendicularly to the substrate, however it is not completely perpendicular. Actually, it is slightly shifted from the perpendicular direction. An increase in the thickness of the block copolymer film causes a position shift between positions of the center of gravity on a cylinder bottom surface of a substrate-copolymer film interface and a cylinder surface of an air-copolymer film interface.

Changes in the process conditions can cope with the lack of etching resistance of the material itself. For example, a procedure for shortening a process time and reducing a plasma power is used.

On the other hand, in order to cope with the variation in the orientation of the cylinder phase, for example, a process of reducing an aspect ratio of sizes in cylinder phase directions perpendicular and parallel to the surface of the substrate is cited. In the case of a cylinder phase having a period of 15 nm, a domain diameter of 7 nm, and a thickness of 100 nm, for the cylinder phase in a substrate direction, an aspect ratio in directions perpendicular and parallel to the surface of the substrate is 14:1.

Figure 11:
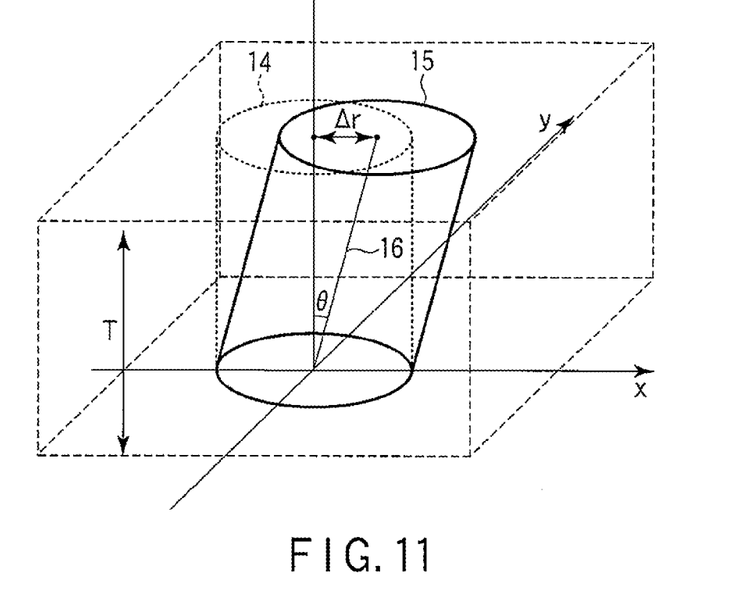
FIG. 11 is a pattern diagram for explaining inclination of a cylinder phase.

FIG. 11 shows a pattern diagram of the cylinder phase 15 in the block copolymer film 14. The cylinder portion is considered to be a structure with an orientation perpendicular to the substrate. However, in fact, it has a structure in which a long axis 16 of the cylinder phase is slightly shifted from an axis perpendicular to the substrate. Here, as shown in FIG. 11, a position of the center of gravity in the bottom surface of a certain cylinder portion at a substrate interface is defined as a starting point. A Cartesian coordinate system is located such that an x-axis and a y-axis are placed in a plane and a z-axis is placed in a direction perpendicular to the plane. The z-axis corresponds to a normal vector direction of the surface of the substrate.

An angle formed by the z-axis and a long axis 9 of the cylinder phase is θ. When θ is equal to 0°, the orientation of the cylinder portion is exactly perpendicular to the substrate. In order to accurately transfer a pattern of phase separation to the substrate by dry etching, it is necessary to place the cylinder portion so as to be perpendicular to the substrate, perform etching perpendicular to the substrate by an anisotropic-dry-etching process, and accurately transfer a dot pattern or a hole pattern to the substrate.

Actually, the cylinder phase is not exactly perpendicular to the substrate. Thus, there is a position shift between the center of gravity of the surface at a film surface side and the center of gravity of the bottom surface at the substrate interface. Even if the dry etching is performed under any condition where the anisotropy is improved, a ratio of the domain size of a transfer pattern and the period length of phase-separated structure of the block copolymer is not 1:1. Here, a diameter of a circle which is the bottom surface of the cylinder or a major axis of an ellipse is referred to as a domain size. For a cylinder phase, a gravity center position shift amount Δr between that at the substrate interface and the that at surface of the cylinder phase is represented by Expression (a) using the thickness T, on a substrate plane surface (XY plane surface).

$$\Delta = T \cdot \tan \theta \tag{a}$$

When the period length of phase-separated structure is A, there is a relationship represented by Expression (b) among a variation σ (standard deviation) of the gravity center position shift Δr, the thickness T, and the phase separation period length A.

$$\sigma^2 \propto T/A \tag{b}$$

In this embodiment, the case there the gravity center position shift Δr is within the variation (standard deviation) is defined as perpendicular orientation. In this case, when θ is $\theta_{max}$ represented by following Expression (c) or less, the cylinder phase is regarded perpendicular.

$$\theta_{max} = \arctan(\sigma/T) \tag{c}$$

Figure 12:
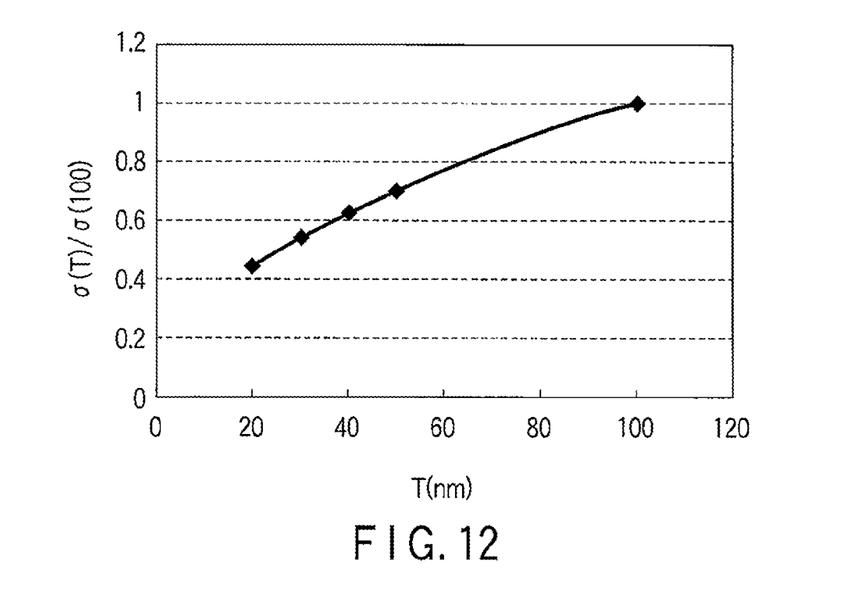
FIG. 12 is a graph showing a relationship between the membrane thickness and the center-of-gravity variation.

In a same periodical structure, the variation σ of the gravity center position shift Δr can be reduced by reducing the thickness. A ratio (σ(T)/σ(100)) of a center of gravity variation σ (100) under a condition of a thickness of 100 nm and a variation σ(T) of a thickness T is calculated and shown in FIG. 12. As the thickness is smaller than 100 nm, the variation is reduced. When the thickness becomes about 30 nm, the variation is decreased by half. When the thickness is decreased and the aspect ratio is reduced, the transfer accuracy can be improved. Even taking into consideration the variation accuracy due to the etching, the thickness of the block copolymer needs to be the period length of phase-separated structure.

As described above, in this embodiment, the microphase-separated structure of the block copolymer is formed on a mesogenic group layer (SAM) with a uniformed interface. The roughness of the phase separation interface is reduced due to the orientation with the molecular level and high accuracy at the interface of the phase-separated structure, thus an ultrathin film structure having extremely small surface roughness of the substrate pattern allows for realization.

When the obtained structure is used for pattern transfer, the period of the microphase-separated structure of the block copolymer is transferred with high accuracy. Thus, for example, when applying this to the patterned media production, a position of the pattern is regulated with accuracy at the molecular size level which is determined by a self-assembled structure so that it is possible to determine positioning of a pattern for read/write head with high accuracy.

Additionally, the arrangement period of phase separation is uniformed with high accuracy to the molecular size level. Thus, for example, when applied to production of high-density patterned media having a pitch of 10 nm or less, one in which a storage cell period in a track direction is constantly accurate is obtained. As for the media thus produced, a jitter noise when writing and reading the record is reduced.

Therefore, according to one embodiment, a structure which is formed by a self-assembled phase separation structure of block copolymer and has a pattern being transferred with sufficient accuracy is produced. Additionally, the pattern is regularly arranged with high accuracy and formed at low cost and high throughput. When applied to high density recording media, highly integrated electronic parts or the like, a decrease in number of substantial processes is possible. This is a great industrial merit.

EXAMPLES

The embodiments will be described in detail below with reference to examples, however the present invention is not limited thereto.

Example 1

As a material for SAM, 1-naphthylmethyl-trichlorosilane (Gelest, Inc.) was prepared. The used compound was a silane coupling agent having a structure represented by a chemical formula below. The agent was dissolved in toluene to prepare 1% by weight of a solution for SAM formation.

A silicon wafer as a substrate was spin coated with thus solution and baked at 100° C. for 10 minutes. After cooling the substrate by natural cooling, the substrate was washed with a toluene solution to form a first layer having a thickness of 5 nm.

Then, an EB resist (ZEP-520A: manufactured by Zeon Corporation) was spin coated on the substrate to form a resist film having a thickness of 50 nm. The resist film was exposed to light using an electron beam drawing apparatus and a line pattern with a pitch of 200 nm and a wide of 100 nm was drawn on the resist film. The resist film after the exposure was developed with a developer (ZMD-B: Zeon Corporation). The substrate was dried by spraying $N_2$ and a resist pattern with a line and space of 1:1 was obtained.

The surface of the substrate was selectively exposed by etching with $O_2$ plasma using the resist pattern as a mask. The resist pattern on the substrate is removed with a resist removing liquid (ZDMAC: Zeon Corporation) and a substrate having the SAM in a predetermined region was obtained.

As the block copolymer containing a mesogenic groups, a block copolymer represented by a chemical formula below was prepared. It was dissolved in toluene to prepare 2% by weight of a solution. The weight average molecular weight of the used block copolymer was 29500 and a hydrophobic polymer accounted for approximately 83% of the whole block copolymer.

The above substrate was spin coated with the toluene solution to form a block copolymer film having a thickness of 30 nm as a second layer. A structure of this example was obtained by vacuum annealing at 150° C. for 24 hours.

Observation of the top of the substrate with an atomic force microscope (AFM) revealed hexagonal close-packed dot patterns in a SAM region on the substrate in a phase mode. The phase separation period length (pitch) was 15 nm and a cylinder phase oriented perpendicularly to the substrate was confirmed. On the other hand, an irregular shape in which dot patterns and the cylinder portion were entangled in an adjacent substrate region was observed.

Comparative Example 1

The same process as Example 1 was performed except that the thickness of the block copolymer film as the second layer was changed to 100 nm. AFM observation revealed hexagonal close-packed dot patterns similar to Example 1 throughout the substrate.

Comparative Example 2

The same process as Example 1 was performed except that a first layer (SAM) was not formed in a predetermined region of a substrate. AFM observation revealed an irregular shape in which dot patterns and the cylinder part were randomly entangled throughout the substrate.

Example 2

As a material of SAM, 4-(6-hydroxyhexyloxy)-4'-methoxybiphenyl (Tokyo Chemical Industries Co., Ltd.) was prepared. The used compound was a mesogenic group containing molecule of OH group end having a structure represented by a chemical formula below. The compound was dissolved in toluene to prepare 1% by weight of a solution for SAM formation.

The silicon substrate was spin coated with the obtained solution at 3000 rpm. The resultant substrate was subjected to vacuum annealing at 150° C. for 72 hours, followed by natural cooling. The surface of the substrate was washed with toluene to form a SAM.

A novolak resist was coated on the SAM to form a resist film having a thickness of 80 nm. An Ni stamper having a convex line pattern with a groove width of 100 nm, a pitch of 200 nm, and a groove depth of 50 nm was used. The pattern was transferred to the resist film by the nanoimprinting process.

The Ni stamper used herein was produced as follows. First, an electron beam resist film was formed on a silicon wafer and the film was subjected to electron beam lithography. The pattern was transferred to the silicon wafer at a depth of 50 nm by RIE using $CF_4$. After removing resist residues, the surface was made conductive by Ni spattering and Ni was deposit on the conductive portion.

The stamper thus produced was pressed against the resist film on the substrate and the pattern of the stamper was transferred to the resist film. When transferring, the substrate was kept at 120° C. After pressing for about 1 minute, the substrate was cooled to a substrate temperature of 80° C. or less. The stamper was removed from the substrate and a resist pattern was obtained. The surface of the substrate was selectively exposed by etching with $O_2$ plasma using the resist pattern as a mask. The resist pattern was removed by washing with toluene and a substrate having the SAM in a predetermined region was obtained.

The same block copolymer as Example 1 was coated on the produced substrate to form a block copolymer film having a thickness of 30 nm as the second layer. A structure of this example was obtained by vacuum annealing at 140° C. for 24 hours.

Observation of the top of the substrate with the AFM revealed hexagonal close-packed dot patterns in the SAM region on the substrate in the phase mode. The phase separation period length (pitch) was 15 nm and a cylinder phase oriented perpendicularly to the substrate was confirmed. On the other hand, an irregular shape in which dot patterns and the cylinder portion were entangled in an adjacent substrate region was observed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure comprising:
   a substrate;
   a first layer formed on the substrate and comprised of a self-assembled monolayer comprising a compound represented by Formula (3) below; and
   a second layer which is formed on the first layer, is obtained by micro-phase separation of a block copolymer comprising a hydrophilic polymer comprised of polyethylene oxide and a hydrophobic polymer comprised of polymethacrylic acid comprising azobenzene at the side chain, comprises a cylinder phase with its long axis being oriented perpendicular to the substrate, and has a thickness T within a range of $A \leq T \leq 50$ nm, where A is a phase separation period length satisfying $5 \text{ nm} \leq A \leq 50$ nm:

wherein Q2 is selected from the group consisting of a methylene group, a phenylene group, a naphthalene group, a divalent organic group comprising at least one methylene group, a divalent organic group comprising at least one phenylene group, and a divalent organic group comprising at least one naphthalene group, Ms2 is a mesogenic group represented by Formula (4A) or (4B) below:

wherein $R^{40}$ to $R^{49}$ may be the same or different and represent a hydrogen atom, an alkyl group having 1 to 4 carbon atoms or an alkoxy group having 1 to 4 carbon atoms.

2. The structure according to claim 1, wherein the substrate is selected from the group consisting of a glass substrate and a silicon substrate.

3. The structure according to claim 2, wherein the substrate has a film of amorphous silicone, $SiO_2$, chromium, nickel, or tantalum on its surface.

4. The structure according to claim 1, wherein a part of hydrogen atoms in the methylene group introduced in the Formula (3) as the Q2 is substituted by an alkyl group.

5. The structure according to claim 4, wherein the alkyl group is selected from the group consisting of a methyl group, an ethyl group, a propyl group, an isopropyl group, a butyl group, a pentyl group, and a hexyl group.

6. The structure according to claim 1, wherein a part of hydrogen atoms in the phenylene group introduced in the Formula (3) as the Q2 is substituted by an alkyl group.

7. The structure according to claim 6, wherein the alkyl group is selected from the group consisting of a methyl group, an ethyl group, a propyl group, an isopropyl group, a butyl group, a pentyl group, and a hexyl group.

8. The structure according to claim 1, wherein a part of hydrogen atoms in the naphthalene group introduced in the Formula (3) as the Q2 is substituted by an alkyl group.

9. The structure according to claim 8, wherein the alkyl group is selected from the group consisting of a methyl group, an ethyl group, a propyl group, an isopropyl group, a butyl group, a pentyl group, and a hexyl group.

10. The structure according to claim 1, wherein the compound represented by the Formula (3) is 4-(6-hydroxyhexyloxy)-4'-methoxybiphenyl.

11. The structure according to claim 1, wherein the block copolymer is represented by a chemical formula below:

* * * * *